US012701131B2

(12) United States Patent
Dai et al.

(10) Patent No.: US 12,701,131 B2
(45) Date of Patent: Aug. 4, 2026

(54) MACHINE LEARNING IDENTIFICATION OF QUANTUM VULNERABLE CRYPTOGRAPHY

(71) Applicant: Raytheon Company, Arlington, VA (US)

(72) Inventors: Liyi Dai, Cambridge, MA (US); Brian Rosenberg, San Diego, CA (US)

(73) Assignee: Raytheon Company, Arlington, VA (US)

( * ) Notice: Subject to any disclaimer, the term of this patent is extended or adjusted under 35 U.S.C. 154(b) by 0 days.

(21) Appl. No.: 18/778,487

(22) Filed: Jul. 19, 2024

(65) Prior Publication Data

US 2026/0075075 A1 Mar. 12, 2026

(51) Int. Cl.
*H04L 9/40* (2022.01)
*G06N 10/40* (2022.01)
*H04L 9/08* (2006.01)
(52) U.S. Cl.
CPC ......... *H04L 63/1433* (2013.01); *G06N 10/40* (2022.01); *H04L 9/0852* (2013.01); *H04L 63/0428* (2013.01)
(58) Field of Classification Search
CPC ....... H04L 63/1433; H04L 63/04–0492; H04L 9/002; H04L 9/0852; G06N 10/40
See application file for complete search history.

(56) References Cited

U.S. PATENT DOCUMENTS

| | | | |
|---|---|---|---|
| 11,322,050 B1 * | 5/2022 | Arbajian | .................. G09C 1/00 |
| 2025/0133101 A1 * | 4/2025 | Rao | ...................... H04L 63/1416 |
| 2025/0165251 A1 * | 5/2025 | Palanki | ..................... G06F 8/75 |

FOREIGN PATENT DOCUMENTS

| | | | | |
|---|---|---|---|---|
| CN | 104009836 A | * | 8/2014 | |
| CN | 105512518 A | * | 4/2016 | ........... G06F 21/125 |

* cited by examiner

*Primary Examiner* — Madhuri R Herzog
(74) *Attorney, Agent, or Firm* — Schwegman Lundberg & Woessner, P.A.

(57) ABSTRACT

Systems, devices, methods, and computer-readable media provide automatic detection of cryptographic algorithms susceptible to compromise by a quantum computer. A method includes receiving, by a trained machine learning (ML) model, a file; executing the trained ML model on the file to generate an output, the output indicating, for each cryptography algorithm of a plurality of cryptography algorithms that are susceptible to compromise by a quantum computer, whether the cryptography algorithm is embodied in or used by the file. Responsive to determining at least one of the cryptography algorithms is embodied or used in the file, performing a mitigation action that reduces or eliminates a vulnerability of the file to compromise by a quantum computer.

14 Claims, 4 Drawing Sheets

300

330 — RECEIVE, BY A TRAINED MACHINE LEARNING (ML) MODEL, A FILE

332 — EXECUTE THE TRAINED ML MODEL ON THE FILE TO GENERATE AN OUTPUT, THE OUTPUT INDICATING, FOR EACH CRYPTOGRAPHY ALGORITHM OF A PLURALITY OF CRYPTOGRAPHY ALGORITHMS THAT ARE SUSCEPTIBLE TO COMPROMISE BY A QUANTUM COMPUTER, WHETHER THE CRYPTOGRAPHY ALGORITHM IS EMBODIED IN OR USED BY THE FILE

334 — RESPONSIVE TO DETERMINING AT LEAST ONE OF THE CRYPTOGRAPHY ALGORITHMS IS EMBODIED OR USED IN THE FILE, PERFORMING A MITIGATION ACTION THAT REDUCES OR ELIMINATES A VULNERABILITY OF THE FILE TO COMPROMISE BY A QUANTUM COMPUTER

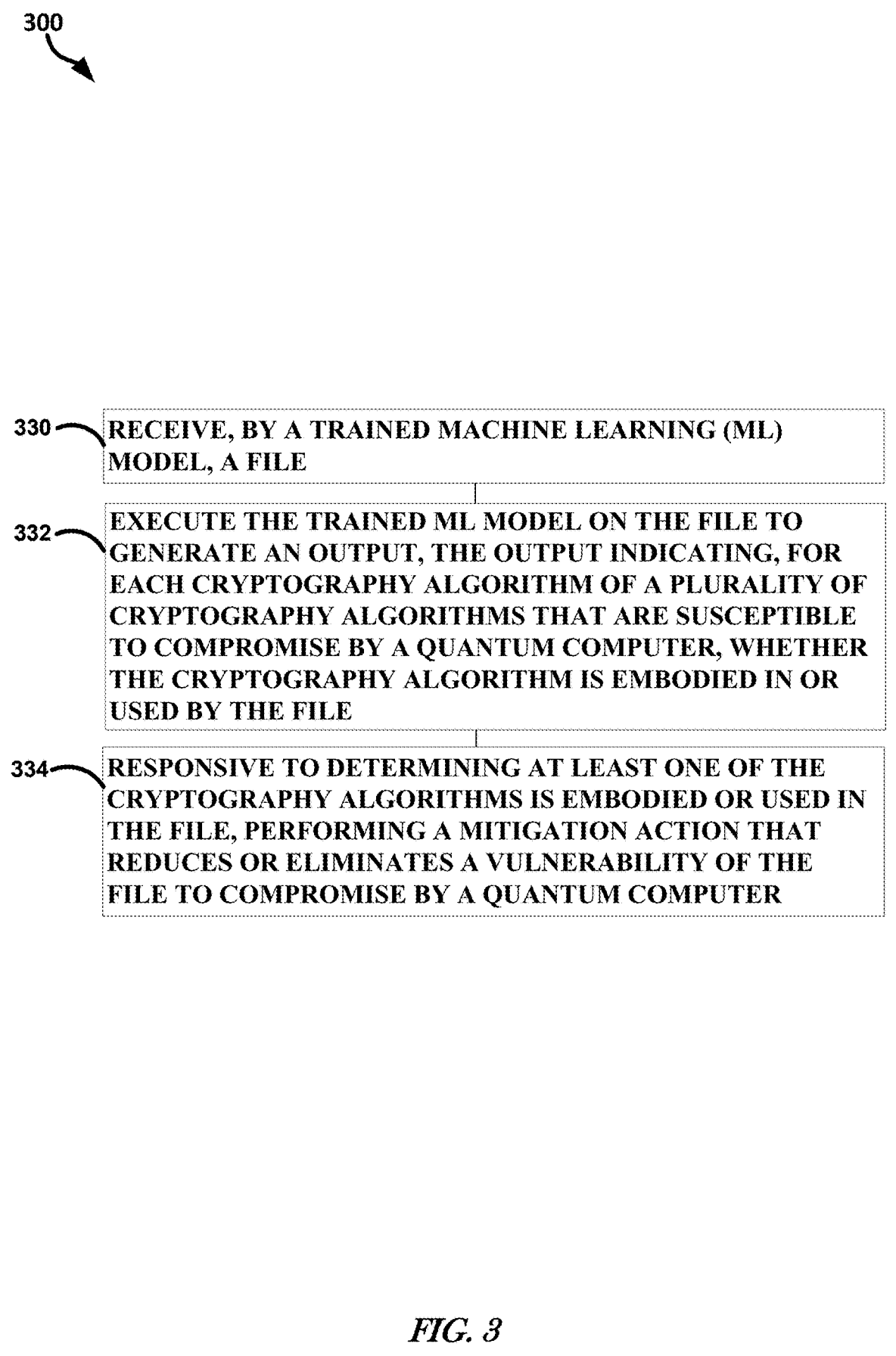

300

330 — RECEIVE, BY A TRAINED MACHINE LEARNING (ML) MODEL, A FILE

332 — EXECUTE THE TRAINED ML MODEL ON THE FILE TO GENERATE AN OUTPUT, THE OUTPUT INDICATING, FOR EACH CRYPTOGRAPHY ALGORITHM OF A PLURALITY OF CRYPTOGRAPHY ALGORITHMS THAT ARE SUSCEPTIBLE TO COMPROMISE BY A QUANTUM COMPUTER, WHETHER THE CRYPTOGRAPHY ALGORITHM IS EMBODIED IN OR USED BY THE FILE

334 — RESPONSIVE TO DETERMINING AT LEAST ONE OF THE CRYPTOGRAPHY ALGORITHMS IS EMBODIED OR USED IN THE FILE, PERFORMING A MITIGATION ACTION THAT REDUCES OR ELIMINATES A VULNERABILITY OF THE FILE TO COMPROMISE BY A QUANTUM COMPUTER

*FIG. 3*

MACHINE LEARNING IDENTIFICATION OF QUANTUM VULNERABLE CRYPTOGRAPHY

TECHNICAL FIELD

Embodiments regard determining whether a file or other data object includes a cryptographic algorithm that is vulnerable to being compromised by quantum computing technologies.

BACKGROUND

Asymmetric cryptography is a foundation of most modern digital data security. Quantum computers store and operate on data represented by physical systems that demonstrate quantum mechanical behaviors. Quantum mechanical behaviors are distinct from behaviors predicted by classical mechanics. Quantum computers are rapidly advancing and will undermine the security provided by asymmetric cryptography.

BRIEF DESCRIPTION OF DRAWINGS

FIG. 3 illustrates, by way of example, a diagram of an embodiment of a method for identifying files containing one or more cryptographic algorithms that may be compromised by a quantum computer.

DETAILED DESCRIPTION

Figures 1, 2:
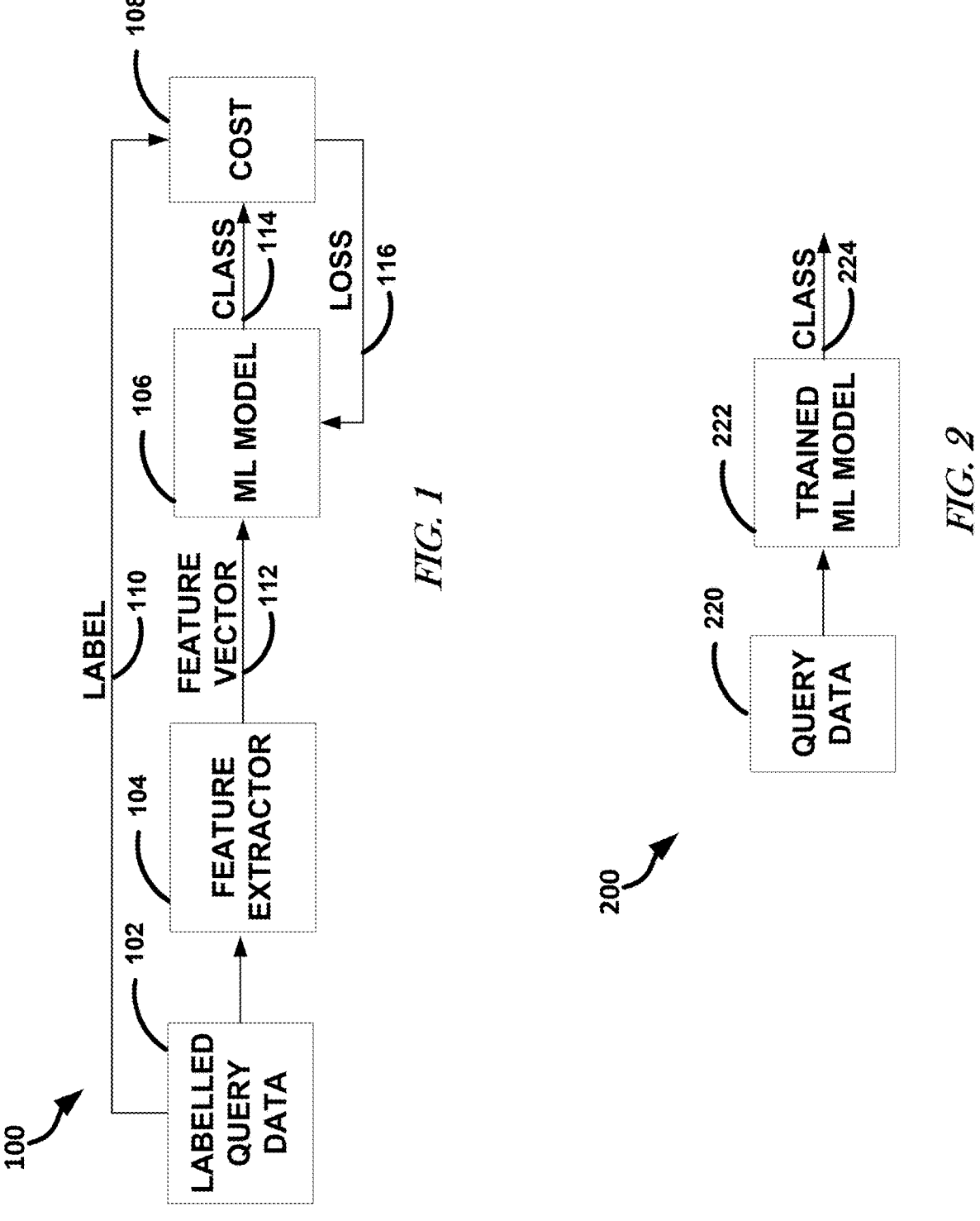
FIG. 1 illustrates, by way of example, a diagram of an embodiment of a system for training an ML model to identify whether a file (sometimes called query data) includes an algorithm that may be compromised using quantum computing.
FIG. 2 illustrates, by way of example, a diagram of an embodiment of a system for using the trained ML model of FIG. 1 after deployment.

The following description and the drawings sufficiently illustrate teachings to enable those skilled in the art to practice them. Other embodiments may incorporate structural, logical, electrical, process, and other changes. Portions and features of some examples may be included in, or substituted for, those of other examples. Teachings set forth in the claims encompass all available equivalents of those claims.

Embodiments may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Embodiments include a machine learning (ML) tool to automatically (e.g., without human involvement after deployment) detect cryptographic algorithms that are vulnerable to quantum computing capabilities. The ML tool can be trained based on human-identified and/or ML-learned features of asymmetric cryptography algorithms. In some instances, a human can review specifications, code, or other documents associated with an asymmetric cryptography algorithm and identify and record features associated with (or unique to) the cryptography algorithm. In some instances, programming code can be written to detect the presence of the said features (e.g., for a library including multiple files or a large number of lines of code). In some instances, a model can learn, by supervised training of a deep neural network (DNN), features sufficient to distinguish among asymmetric cryptography algorithms.

The features can include text strings, numbers, mathematical operations, function calls, a combination thereof, or the like. The features are likely relevant to a given asymmetric cryptography algorithm. The features jointly are likely to identify a given asymmetric cryptography algorithm.

An ML model can be trained based on the features and labels. The ML model can then receive, as input, one or more files, a library including one or more files (e.g., a folder or multiple folders), or other data object. The ML model can provide output that indicates whether the file or library includes an implementation of one or more asymmetric cryptography algorithms. A mitigation operation can then be performed to alleviate the vulnerability of asymmetric cryptography algorithm. The mitigation operation can include replacing or supplementing the asymmetric cryptography algorithm with a cryptography algorithm that is not vulnerable to compromise by quantum computing technologies. Replacing the cryptography algorithm can include replacing a subset of the files or all files (typically a set of files collectively called a library) related to the cryptography algorithm. The whole cryptography module or block may be replaced with a new cryptography routine or library.

FIG. 1 illustrates, by way of example, a diagram of an embodiment of a system 100 for training an ML model 106 for identifying whether a file (sometimes called query data) includes an algorithm that is vulnerable to compromise using quantum computing. The system 100 includes labelled query data 102 that is provided to a feature extractor 104. The feature extractor 104 identifies features 112 that are provided to an ML model 106. The ML model 106 determines a classification 114 of the labelled query data 102 based on the features 112. A difference between the classification 114 and a label 110 for the labelled query data 102 are converted to a loss 116 by a cost operator 108.

The labelled query data 102 includes individual files or collections of files that implement all or part of a quantum-vulnerable asymmetric cryptographic algorithm or make a function call to such an algorithm. Each instance of the labelled query data 102 includes a corresponding label 110. The label 110 identifies the quantum-vulnerable cryptographic algorithm that is implemented or called in the corresponding data.

The feature extractor 104 identifies features that are present in the labelled query data 102 and inform or guide execution of the ML model 106. The feature extractor 104 generates a feature vector 112 that is used as input to an ML model 106. The feature extractor 104 can be implemented in part by a text search for pre-identified features included in the feature vector 112. The feature extractor 104 can be implemented by one or more embedding layers or other feature-generating neural network (NN) layers. The feature vector 112 can thus be generated (expressly or implicitly) by one or more NN layers.

Examples of cryptography algorithms that are susceptible to quantum computer cracking and corresponding features are provided:

Cryptography algorithm: Rivest-Shamir-Adleman (RSA)

Features: 'rsa'; 'key'; 'private'; 'public'; 'pow'; 'exp'; 'modpow'; 'mod'; '%'; 'prime'.

Cryptography Algorithm: Diffie Hellman

Features: 'dh'; 'Diffie-Hellman'; 'ffdh'; '741804'; '1984'; '124476'; '3072'; '3008'; '2942'; '1690314'; '4032'; '3966'; '240904'; '6144'; '6080'; '6014'; '929484'; '8192'; '8128'; '8062'; '4743158'; 'C90FDAA2'; '2168C234'; 'C4C6628B'; '80DC1CD1'; '29024E08'; '8A67CC74'; '020BBEA6'; '3B139B22'; '514A0879'; '8E3404DD'; 'EF9519B3'; 'CD3A431B'; '302B0A6D'; 'F25F1437'; '4FE1356D'; '6D51C245'; 'E485B576'; '625E7EC6'; 'F44C42E9'; 'A637ED6B'; 'OBFF5CB6'; 'F406B7ED'; 'EE386BFB'; '5A899FA5'; 'AE9F2411'; '7C4B1FE6'; '49286651'; 'ECE45B3D'; 'C2007CB8'; 'A163BF05'; '98DA4836'; '1C55D39A'; '69163FA8'; 'FD24CF5F'; '83655D23'; 'DCA3AD96'; '1C62F356'; '208552BB'; '9ED52907'; '7096966D'; '670C354E'; '4ABC9804'; 'F1746C08'; 'CA237327'; 'floor'; '%'; 'pi'.

Cryptography Algorithm: Elliptic Curve Diffie-Hellman

Features: 'ecdh'; 'ecdhe'; 'x25519'; 'x448'; 'Weierstrass'; 'elliptic'; 'Montgomery'; 'Goldilocks', 'Koblitz'; 'curve25519'; 'X25519'; 'P-256'; '224'; '233'; '25519'; '283'; '384'; '409'; '448'; '521'; '571'; 'K-233'; 'B-233'; 'K-283'; 'B-283'; 'K-409'; 'B-409'; 'K-571'; 'B-571'; 'P-224'; 'P-384'; 'P-521'; 'K233'; 'B233'; 'K283'; 'B283'; 'K409'; 'B409'; 'K571'; 'B571'; 'P224'; 'P256'; 'P384'; 'P521'; 'curve448'.

Cryptography Algorithm: Digital Signature Algorithm (DSA)

Features: 'dsa'.

Cryptography Algorithm: Elliptic Curve DSA (ECDSA)

Features: 'ecdsa'; 'mod_inverse'; 'K-233'; 'B-233'; 'K-283'; 'B-283'; 'K-409'; 'B-409'; 'K-571'; 'B-571'; 'P-224'; 'P-256'; 'P-384'; 'P-521'; 'K233'; 'B233'; 'K283'; 'B283'; 'K409'; 'B409'; 'K571'; 'B571'; 'P224'; 'P256'; 'P384'; 'P521'.

Cryptography Algorithm: Edwards Curve DSA (EdDSA)

Features: 'eddsa'; 'twisted_edwards'; 'Ed25519'; 'edwards25519'; 'ed448'; 'edwards448'; 'fe25519'; 'ge25519'; 'sc25519'; 'ristretto255'; 'decaf448'; 'concatenat'; '121665'; '121666'; '14781619447589 5447910205935684099868872646061346164752889- 64881837755586237401'; '37095705934669439343- 13808350875456518954211387984321190163887- 85533085940283555'; '15112221349535400 77250- 11514095885315114540126930418572060461 1328- 3949847762202'; '355293926785568175264127 5020- 63783334808976399387714271831881880898 4351690- 8878696 7410002932637376586455091014277414 72- 68105838985595290606362'; '345397493039729- 51637400860415053741026665526007518329021 6- 40697028164569507367 234443048178775 93406- 332- 21708391583424041788924124567700732'; '1478161944'; '3709570593466'; '151122213495';

'355293926785'; '345397493039'; '98819210078'; '0x52036CEE2B6FFE738CC740797779E89800700A4D4141D8AB75EB4D0 '0x8335dc163bb124b65129c96fde933d8d723a70aadc873d6d54a7bb0d'; '0x52036CEE2B6FFE738CC'; '0x8335dc163bb1'; '0x706A17C7U'; '0x4FD84D3DU'; '0x760B3CBAU'; '0x0F67100DU'; '0xFA53202AU'; '0x013FEC0A'; '0x029E6B72'; '0x0042D26D'; '0x0011EB98'; '0x003E5FC8'; '0x024E1739'; '0x0131CD0B'; '0x014E29A0'; '0x02D37284'; '0x018AB75E'; '0x026A0A0E'; '0x0000E014'; 'x0165E2B2'; '0x034DCA13'; '0x002ADD7A'; '0x01A8283B'; '0x00038052'; '0x01E7A260'; '0x0379E898'.

Cryptography Algorithm: Menezes-Qu-Vanstone (MQV)

Features: 'mqv', 'Menezes-Qu-Vanstone'; 'ceil_log 2'.

The ML model 106 receives the feature vector 112 and generates the classification 114 based on the feature vector 112. The ML model 106 can include a deep neural network (DNN), a support vector machine (SVM) model, or the like. In training, the ML model 106 predicts a classification 114 for the feature vectors 112. The classification 114 is a vector that includes, for each cryptography algorithm that the ML model 106 is trained to detect, a value that indicates a likelihood that the cryptography algorithm is present in the query data 102. Note that multiple cryptography algorithms can be present in a given instance of the query data 102.

A cost operator 108 determines a loss 116 based on a difference between the classification 114 and the label 110. The loss 116 is used to adjust parameters (weights of neurons in the case of a DNN or kernel parameters or soft margin parameter in the case of SVM). SVMs, DNNs, and corresponding loss functions are well known. A trained ML model 222 is the result of training the ML model 106 using the system 100.

A DNN is an ML model comprised of multiple layers of neurons. The DNN is an artificial NN with one or more layers between the input and output layers. There are different types of NNs, but NNs consist of the same components: neurons, synapses, weights, biases, and functions. These components as a whole function in a way that mimics functions of the human brain and can be trained like any other ML algorithm.

DNNs can model complex non-linear relationships. DNN architectures generate compositional models where the object is expressed as a layered composition of primitives. The extra layers enable composition of features from lower layers, potentially modeling complex data with fewer units than a similarly performing shallow network. For instance, sparse multivariate polynomials are exponentially easier to approximate with DNNs than with shallow networks.

Deep architectures include many variants of a few basic approaches. Each architecture has found success in specific domains. It is not always possible to compare the performance of multiple architectures, unless they have been evaluated on the same data sets.

DNNs are typically feedforward networks in which data flows from the input layer to the output layer without looping back. At first, the DNN creates a map of virtual neurons and assigns random numerical values, or "weights", to connections between them. The weights and inputs are multiplied and return an output between 0 and 1. If the network did not accurately recognize a particular pattern, an algorithm would adjust the weights. That way the algorithm can make certain parameters more influential, until it determines the correct mathematical manipulation to fully process the data. Recurrent neural networks (RNNs) and convolutional neural networks (CNNs) are examples of NN architectures.

SVMs are supervised max-margin models with associated learning algorithms that analyze data for classification and regression analysis. In addition to performing linear classification, SVMs can efficiently perform a non-linear classification using what is called the kernel trick, which represent the data only through a set of pairwise similarity comparisons between the original data observations and representing the data by these transformed coordinates in the higher dimensional feature space. Thus, SVMs use the kernel trick to implicitly map their inputs into high-dimensional feature spaces. Being max-margin models, SVMs are resilient to noisy data (for example, mis-classified examples). SVMs can also be used for regression tasks.

FIG. 2 illustrates, by way of example, a diagram of an embodiment of a system 200 for using the trained ML model 222 after deployment. The trained ML model 222 receives query data 220 and generates a classification 224 based on the query data 220. The query data 220 is different from the labelled query data 102 in FIG. 1 in that the query data 220 was very likely not used in training the trained ML model 222. The classification 224 is a vector that has the same structure as the classification 114. The trained ML model 222 is used to identify cryptography algorithms that may be compromised by quantum computers.

FIG. 3 illustrates, by way of example, a diagram of an embodiment of a method 300 for. The method 300 as illustrated includes receiving, by a trained machine learning (ML) model, a file, at operation 330; executing the trained ML model on the file to generate an output, the output indicating, for each cryptography algorithm of a plurality of cryptography algorithms that are susceptible to compromise by a quantum computer, whether the cryptography algorithm is embodied in or used by the file, at operation 332; and responsive to determining at least one of the cryptography algorithms is embodied or used in the file, performing a mitigation action that reduces or eliminates a vulnerability of the file to compromise by a quantum computer, at operation 334.

The mitigation action can include replacing the cryptography algorithm in the file with a cryptography algorithm that is not susceptible to compromise by a quantum computer. The ML model can be a deep neural network (DNN). The ML model can be a support vector machine (SVM) model.

The method 300 can further include identifying features of each of the plurality of cryptography algorithms; the features, when present in the file, indicating the presence of quantum vulnerable cryptography algorithms. The features can include text representative of a name of the cryptography algorithm, a number used in the cryptography algorithm, and/or text representative of a function called by the cryptography algorithm. The method 300 can further include training the ML model based on files that are labelled to indicate which of the plurality of cryptography algorithms is embodied or used therein.

Artificial Intelligence (AI) is a field concerned with developing decision-making systems to perform cognitive tasks that have traditionally required a living actor, such as a person. NNs are computational structures that are loosely modeled on biological neurons. Generally, NNs encode information (e.g., data or decision making) via weighted connections (e.g., synapses) between nodes (e.g., neurons). Modern NNs are foundational to many AI applications, such as classification (as in the present application), device behavior modeling, or the like. The ML model 106 or trained ML model 222 or other component or operation can include or be implemented using one or more NNs.

Many NNs are represented as matrices of weights (sometimes called parameters) that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph—if the threshold is not exceeded then, generally, the value is not transmitted to a down-graph neuron and the synaptic connection remains inactive. The process of weighting and testing continues until an output neuron is reached; the pattern and values of the output neurons constituting the result of the NN processing.

The optimal operation of most NNs relies on accurate weights. However, NN designers do not generally know which weights will work for a given application. NN designers typically choose a number of neuron layers or specific connections between layers including circular connections. A training process may be used to determine appropriate weights by selecting initial weights.

In some examples, initial weights may be randomly selected. Training data is fed into the NN, and results are compared to an objective function that provides an indication of error. The error indication is a measure of how wrong the NN's result is compared to a desired result. This error is then used to correct the weights. Over many iterations, the weights will collectively converge to encode the operational data into the NN. This process may be called an optimization of the objective function (e.g., a cost or loss function), whereby the cost or loss is minimized.

A gradient descent technique is often used to perform objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Figure 4:
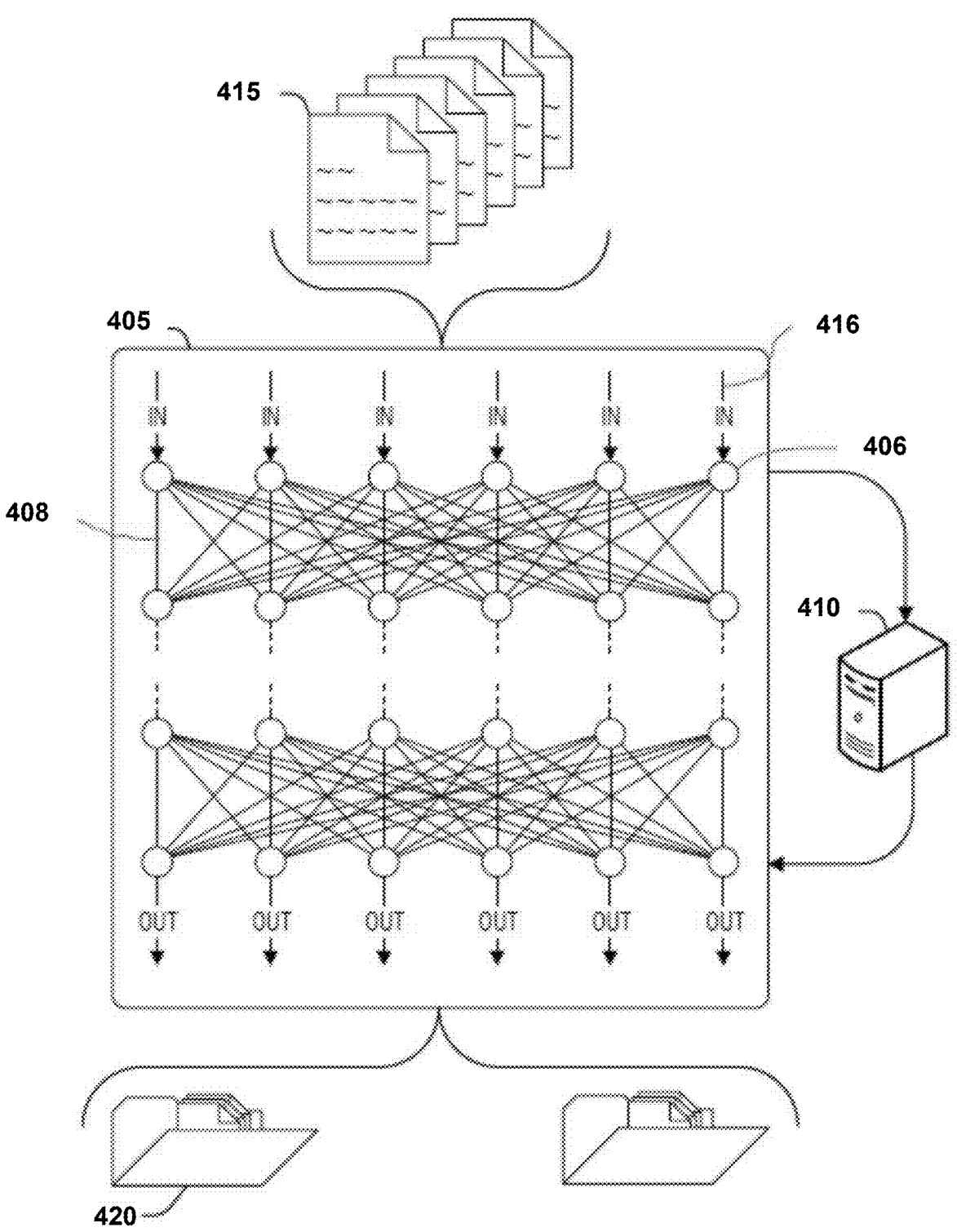
FIG. 4 is a block diagram of an example of an environment including a system for neural network (NN) training.

FIG. 4 is a block diagram of an example of an environment including a system for neural network (NN) training. The system includes an artificial NN (ANN) 405 that is trained using a processing node 410. The processing node 410 may be a central processing unit (CPU), graphics processing unit (GPU), field programmable gate array (FPGA), digital signal processor (DSP), application specific integrated circuit (ASIC), or other processing circuitry. In an example, multiple processing nodes may be employed to train different layers of the ANN 405, or even different nodes 406 within layers. Thus, a set of processing nodes 410 is arranged to perform the training of the ANN 405. The ML model 106, trained ML model 222, or other component of the systems 100, 200 can be trained using the system of FIG. 4.

The set of processing nodes 410 is arranged to receive a training set 415 for the ANN 405. The ANN 405 comprises a set of nodes 406 arranged in layers (illustrated as rows of nodes 406) and a set of inter-node weights 408 (e.g., parameters) between nodes in the set of nodes. In an example, the training set 415 is a subset of a complete training set. Here, the subset may enable processing nodes with limited storage resources to participate in training the ANN 405.

The training data may include multiple numerical values representative of a domain, such as an image feature, or the like. After ANN 405 is trained, each value of the training or input 415 to be classified is provided to a corresponding node 406 in the first layer or input layer of ANN 405. The values propagate through the layers and are changed by the objective function.

In an example, each iteration of training the ANN 405 is performed independently between layers of the ANN 405. Thus, two distinct layers may be processed in parallel by different members of the set of processing nodes. In an example, different layers of the ANN 405 are trained on different hardware. The members of different members of the set of processing nodes may be located in different packages, housings, computers, cloud-based resources, etc. In an example, each iteration of the training is performed independently between nodes in the set of nodes. This example is an additional parallelization whereby individual nodes 406 (e.g., neurons) are trained independently. In an example, the nodes are trained on different hardware.

After the ANN 405 is trained, it will produce classifications 420 for any input data 415 (e.g., the input data 415 will be assigned into categories), for example.

Figure 5:
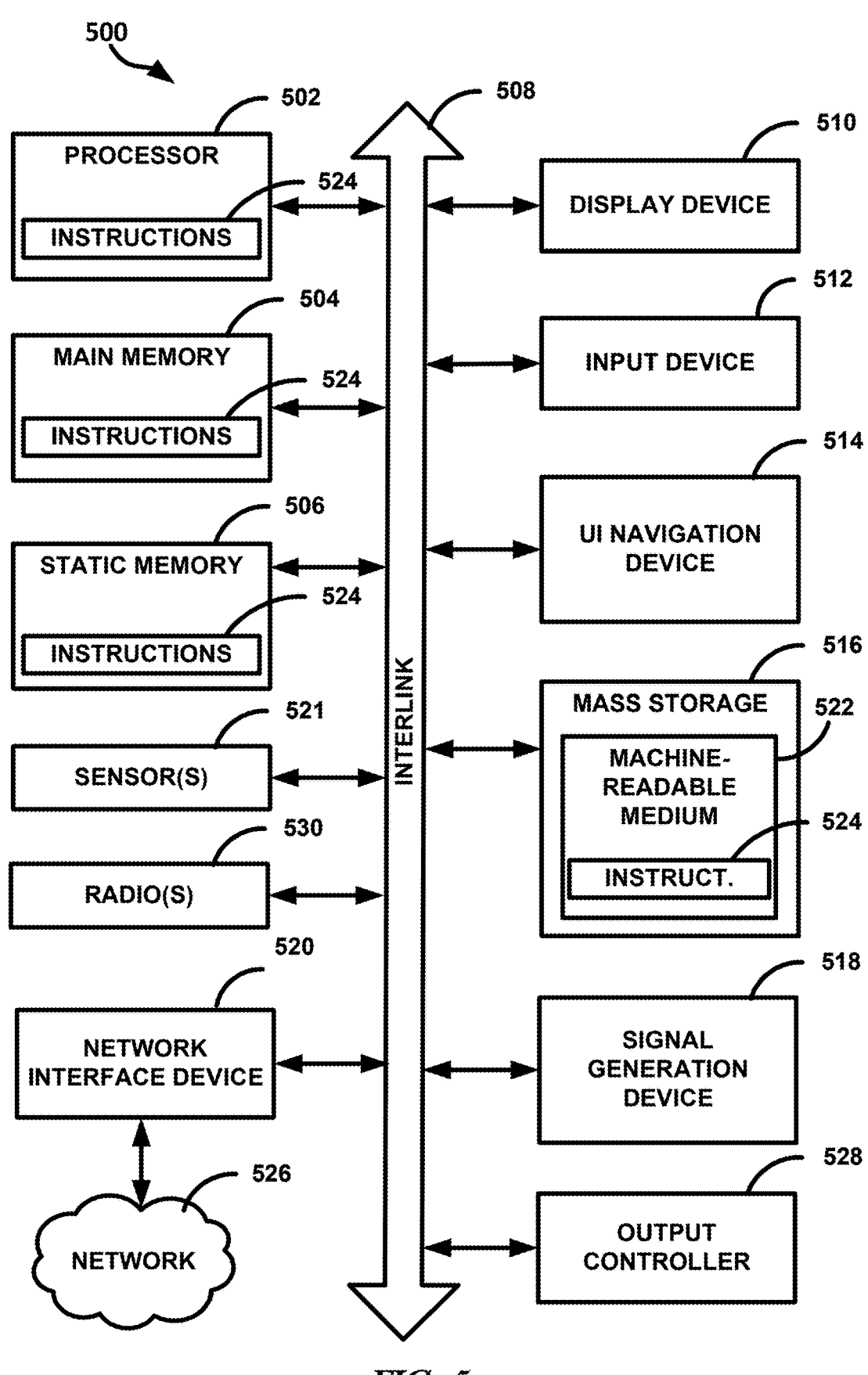
FIG. 5 illustrates, by way of example, a block diagram of an embodiment of a machine in the example form of a computer system within which instructions for causing the machine to perform any one or more of the methods or techniques discussed herein, may be executed.

FIG. 5 illustrates, by way of example, a block diagram of an embodiment of a machine in the example form of a computer system 500 within which instructions for causing the machine to perform any one or more of the methods or techniques discussed herein may be executed. One or more of the feature extractor 104, ML model 106, cost operator 108, trained ML model 222, method 300, system of FIG. 1 or FIG. 2, or other component, operation, or technique, can include, or be implemented or performed by one or more of the components of the computer system 500. In a networked deployment, the machine may operate in the capacity of a server or a client machine in server-client network environment, or as a peer machine in a peer-to-peer (or distributed) network environment. The machine may be a personal computer (PC), server, a tablet PC, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device 514 (e.g., a mouse), a mass storage unit 516, a signal generation device 518 (e.g., a speaker), a network interface device 520, and a radio 530 such as Bluetooth, WWAN, WLAN, and NFC, permitting the application of security controls on such protocols.

The mass storage unit 516 includes a machine-readable medium 522 on which is stored one or more sets of instructions and data structures (e.g., software) 524 embodying or utilized by any one or more of the methodologies or functions described herein. The instructions 524 may also reside, completely or at least partially, within the main memory 504 and/or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding, or carrying instructions for execution by the machine and that cause the machine to perform any one or more of the methodologies of the present invention, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 524 may further be transmitted or received over a communications network 526 using a transmission medium. The instructions 524 may be transmitted using the network interface device 520 and any one of a number of well-known transfer protocols (e.g., HTTPS). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of encoding, or carrying instructions for execution by the machine, and includes digital or analog communications signals or other intangible media to facilitate communication of such software.

Additional Examples

Example 1 includes a method comprising receiving, by a trained machine learning (ML) model, a file, executing the trained ML model on the file to generate an output, the output indicating, for each cryptography algorithm of a plurality of cryptography algorithms that are susceptible to compromise by a quantum computer, whether the cryptography algorithm is embodied in or used by the file, and responsive to determining at least one of the cryptography algorithms is embodied or used in the file, performing a mitigation action that reduces or eliminates a vulnerability of the file to compromise by a quantum computer.

In Example 2, Example 1 can further include, wherein the mitigation action includes replacing the cryptography algorithm in the file with a cryptography algorithm that is not susceptible to compromise by a quantum computer.

In Example 3, at least one of Examples 1-2 further includes, wherein the ML model is a deep neural network (DNN).

In Example 4, at least one of Examples 1-3 further includes, wherein the ML model is a support vector machine (SVM) model.

In Example 5, at least one of Examples 1-4 further includes identifying features of each of the plurality of cryptography algorithms; the features, when present in the file, indicating the presence of quantum vulnerable cryptography algorithms.

In Example 6, Example 5 further includes, wherein the features include text representative of a name of the cryptography algorithm, a number used in the cryptography algorithm, and/or text representative of a function called by the cryptography algorithm.

In Example 7, at least one of Examples 1-6 further includes training the ML model based on files that are labelled to indicate which of the plurality of cryptography algorithms is embodied or used therein.

Example 8 includes a system configured to implement the method of at least one of Examples 1-7.

Example 9 includes a non-transitory machine-readable medium including instructions that, when executed by a machine, cause the machine to perform operations of the system of at least one of Examples 1-7.

Although teachings have been described with reference to specific example teachings, it will be evident that various modifications and changes may be made to these teachings without departing from the broader spirit and scope of the teachings. Accordingly, the specification and drawings are to be regarded in an illustrative rather than a restrictive sense. The accompanying drawings that form a part hereof, show by way of illustration, and not of limitation, specific teachings in which the subject matter may be practiced. The teachings illustrated are described in sufficient detail to enable those skilled in the art to practice the teachings disclosed herein. Other teachings may be utilized and derived therefrom, such that structural and logical substitutions and changes may be made without departing from the scope of this disclosure. This Detailed Description, therefore, is not to be taken in a limiting sense, and the scope of various teachings is defined only by the appended claims, along with the full range of equivalents to which such claims are entitled.

What is claimed is:

1. A method comprising:

receiving, by a trained machine learning (ML) model, a file comprising contents including source code, a function call, or mathematical operations;

executing the trained ML model on the contents of the file to generate an output comprising a classification vector, the output indicating, for each cryptography algorithm of a plurality of asymmetric cryptography algorithms that are susceptible to compromise by a quantum computer, whether the cryptography algorithm is embodied in or used by the file; and responsive to determining, based on the classification vector, that at least one of the cryptography algorithms is embodied or used in the file, replacing the contents in the file associated with the cryptography algorithm with corresponding contents that are not susceptible to compromise by a quantum computer.

2. The method of claim 1, wherein the ML model comprises a deep neural network (DNN).

3. The method of claim 1, wherein the ML model comprises a support vector machine (SVM) model.

4. The method of claim 1, further comprising, by executing the trained ML model on the contents of the file, identifying features of each of the plurality of cryptography algorithms;

the features, when present in the file, indicating the presence of quantum vulnerable cryptography algorithms.

5. The method of claim 4, wherein the features include text representative of a name of the cryptography algorithm, a number used in the cryptography algorithm, and/or text representative of a function called by the cryptography algorithm.

6. The method of claim 1, further comprising training the ML model based on files associated with a label vector comprising, for each asymmetric cryptography algorithm susceptible to compromise by a quantum computer, a present/not-present indication.

7. The method of claim 1, wherein the trained ML model comprises a plurality of ML models, each of the ML models corresponding to the plurality of cryptography algorithms susceptible to compromise by a quantum computer, wherein each ML model is a binary classifier trained to output a value for a respective asymmetric cryptography algorithm indicating whether that algorithm is embodied in or used by the file.

8. A non-transitory machine-readable medium including instructions that, when executed by a machine, cause the machine to perform operations for identifying a cryptography algorithm, in a file, that is vulnerable to compromise by a quantum computer, the operations comprising:

receiving, by a trained machine learning (ML) model, a file comprising contents including source code, a function call, or mathematical operations; and executing the trained ML model on the contents of the file to generate an output comprising a classification vector, the output indicating, for each cryptography algorithm of a plurality of asymmetric cryptography algorithms that are susceptible to compromise by the quantum computer, whether the cryptography algorithm is embodied in or used by the file; and responsive to determining, based on the classification vector, that at least one of the cryptography algorithms is embodied or used in the file, replacing the contents in the file associated with the cryptography algorithm with corresponding contents that are not susceptible to compromise by a quantum computer.

9. The non-transitory machine-readable medium of claim 8, wherein the ML model is a deep neural network (DNN).

10. The non-transitory machine-readable medium of claim 8, wherein the ML model is a support vector machine (SVM) model.

11. The non-transitory machine-readable medium of claim 8, further comprising, by executing the trained ML model on the contents of the file, identifying features of each of the plurality of cryptography algorithms;

the features, when present in the file, indicating the presence of quantum vulnerable cryptography algorithms.

12. The non-transitory machine-readable medium of claim 11, wherein the features include text representative of a name of the cryptography algorithm, a number used in the cryptography algorithm, and/or text representative of a function called by the cryptography algorithm.

13. The non-transitory machine-readable medium of claim 8, further comprising training the ML model based on files associated with a label vector comprising, for each asymmetric cryptography algorithm susceptible to compromise by a quantum computer, a present/not-present indication.

14. A system comprising:

processing circuitry; and a memory including instructions that, when executed by the processing circuitry, cause the processing circuitry to perform operations comprising:

receiving, by a trained machine learning (ML) model, a file comprising contents including source code, a function call, or mathematical operations; and executing the trained ML model on the contents of the file to generate an output comprising a classification vector, the output indicating, for each cryptography algorithm of a plurality of asymmetric cryptography algorithms that are susceptible to compromise by a quantum computer, whether the cryptography algorithm is embodied in or used by the file; and responsive to determining, based on the classification vector, that at least one of the cryptography algorithms is embodied or used in the file, replacing the contents in the file associated with the cryptography algorithm with corresponding contents that are not susceptible to compromise by a quantum computer.

\* \* \* \* \*